United States Patent
Wang

(10) Patent No.: US 9,085,722 B2
(45) Date of Patent: Jul. 21, 2015

(54) ACRYLOYLMORPHOLINE POLYMER AND USE THEREOF AND FILTRATE REDUCER FOR DRILLING FLUID

(71) Applicants: CHINA PETROLEUM & CHEMICAL CORPORATION, Chaoyang District (CN); SINOPEC ZHONGYUAN OILFIELD SERVICE CORPORATION DRILLING ENGINEERING RESEARCH INSTITUTE, Puyang (CN)

(72) Inventor: Zhonghua Wang, Puyang (CN)

(73) Assignees: CHINA PETROLEUM & CHEMICAL CORPORATION, Beijing (CN); SINOPEC ZHONGYUAN OILFILD SERVICE CORPORATION DRILLING ENGINEERING RESEARCH INSTITUTE, Puyang (CN)

( * ) Notice: Subject to any disclaimer, the term of this patent is extended or adjusted under 35 U.S.C. 154(b) by 160 days.

(21) Appl. No.: 14/031,115

(22) Filed: Sep. 19, 2013

(65) Prior Publication Data

US 2014/0080985 A1    Mar. 20, 2014

(30) Foreign Application Priority Data

Sep. 20, 2012 (CN) .......................... 2012 1 0353653
Jul. 5, 2013 (CN) .......................... 2013 1 0282326

(51) Int. Cl.
| C09K 8/035 | (2006.01) |
|---|---|
| C08F 220/58 | (2006.01) |
| C09K 8/24 | (2006.01) |
| C09K 8/508 | (2006.01) |

(52) U.S. Cl.
CPC ............... *C09K 8/035* (2013.01); *C08F 220/58* (2013.01); *C09K 8/24* (2013.01); *C09K 8/5083* (2013.01)

(58) Field of Classification Search
CPC ........ C08F 220/58; C09K 8/035; C09K 8/24; C09K 8/5083
USPC ................................................. 526/260, 229
See application file for complete search history.

(56) References Cited

U.S. PATENT DOCUMENTS

2008/0114123 A1*  5/2008  Tighe et al. ..................... 525/55

FOREIGN PATENT DOCUMENTS

| CN | 102382245 A | 3/2012 |
| CN | 102516455 A | 6/2012 |

Primary Examiner — Ling Choi
Assistant Examiner — Chun-Cheng Wang
(74) Attorney, Agent, or Firm — Buchanan Ingersoll & Rooney PC

(57) ABSTRACT

The present invention provides an acryloylmorpholine polymer and the use thereof and a filtrate reducer for drilling fluid. The acryloylmorpholine polymer comprises structural units expressed by formula (1), structural units expressed by formula (2), and structural units expressed by formula (3), wherein, at least a part of the structural units expressed by formula (2) can be bonded with at least a part of the structural units expressed by formula (3) into cross-linked structural unit expressed by formula (4); wherein, $R_1$-$R_9$ are H or $C_1$-$C_3$ linear or branched alkyl respectively, y is an integer within 1-5 range, M is H or an alkali metal element, X is O or NH, and $R_{10}$ is $C_1$-$C_5$ linear or branched alkylene. The acryloylmorpholine polymer and filtrate reducer for drilling fluid have outstanding filtrate reduction and viscosity increasing effects.

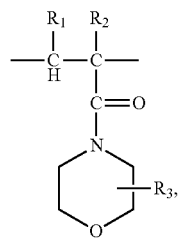

formula (1)

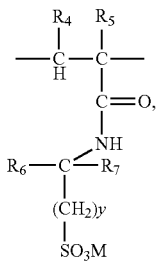

formula (2)

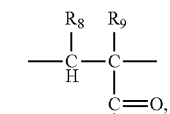

formula (3)

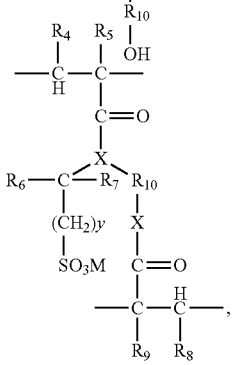

formula (4)

19 Claims, No Drawings

ACRYLOYLMORPHOLINE POLYMER AND USE THEREOF AND FILTRATE REDUCER FOR DRILLING FLUID

CROSS REFERENCE TO RELATED APPLICATIONS

This application claims the priority to Chinese Application No. 201210353653.9, filed on Sep. 20, 2012, entitled "Acryloylmorpholine Polymer Treating Agent Used for Drilling Fluid and Preparation thereof", and claims the priority to Chinese Application No. 201310282326.3, filed on Jul. 5, 2013, entitled "Acryloylmorpholine Polymer and Use thereof and Filtrate Reducer for Drilling Fluid", which are specifically and entirely incorporated by reference.

FIELD OF THE INVENTION

The present invention relates to an acryloylmorpholine polymer, an use of the acryloylmorpholine polymer as a filtrate reducer for drilling fluid, and a filtrate reducer for drilling fluid.

BACKGROUND OF THE INVENTION

In the petroleum drilling process, the encountered formations are more and more complex, and the numbers of exceptional wells, ultra-deep wells, and complex wells increase with years, which brings higher requirements for the drilling fluid. In view of that situation, domestic and foreign researchers have made a series of researches on high temperature resistant filtrate reducers for drilling fluid. However, for existing filtrate reducers for drilling fluid, the dosage of the filtrate reducer for drilling fluid must be increased to improve high temperature resistance and salt resistance performance of deep wells and ultra-deep wells. But increased dosage of filtrate reducer for drilling fluid will cause increased viscosity of the drilling fluid; especially, in the case of high calcium content and/or magnesium content, it is more difficult to control the properties of drilling fluid. Therefore, existing filtrate reducers for drilling fluid can't fully meet the requirements for well drilling. Shale gas is exploited mainly in shallow extended reach wells and clustered horizontal wells, owing to the accumulation characteristics of shale gas. Owing to the fact that the water sensitivity of fractures in shale formations is high and shale formations usually have long horizontal sections, well leakage, collapse, and shrinkage phenomena may occur during well drilling in the long horizontal sections, and friction resistance, rock carrying, and formation contamination problems may exist, increasing complexity in the well environment. Therefore, in drilling fluid selection and design, it is crucial to ensure well wall stability, reduce resistance and friction, and remove cuttings beds in horizontal well drilling for shale gas. To meet the requirement for well wall stability, oil-based drilling fluid systems are used in 60-70% horizontal shale gas wells in foreign countries; in addition, oil-based drilling fluids are used in most horizontal shale gas wells finished recently in China. However, water-based drilling fluids are the best choice, because oil-based drilling fluids have high cost and environmental pollution problems. Nevertheless, researches have shown that the active shale rocks may have water loss or dehydration phenomenon when they are exposed to water-based drilling fluids with high salinity (e.g., 35% $CaCl_2$ water solution). Hence, it is urgent task to develop a filtrate reducer that has outstanding filtrate reduction performance and viscosity increasing effect, to meet the requirements of horizontal well drilling for shale gas.

SUMMARY OF THE INVENTION

The object of the present invention is to provide an acryloylmorpholine polymer which has outstanding filtrate reduction performance and viscosity increasing effect, use of the acryloylmorpholine polymer as a filtrate reducer for drilling fluid, and a filtrate reducer for drilling fluid.

The present invention provides an acryloylmorpholine polymer, comprising structural units expressed by formula (1), structural units expressed by formula (2), and structural units expressed by formula (3), wherein, at least a part of the structural units expressed by formula (2) are bonded with at least a part of the structural units expressed by formula (3) into cross-linked structural units expressed by formula (4); on the basis of 1 mol structural units expressed by formula (1), the total content of the structural units expressed by formula (2) and cross-linked structural units expressed by formula (4) is 0.5-10 mol, and the total content of the structural units expressed by formula (3) and the cross-linked structural units expressed by formula (4) is 0.01-0.05 mol;

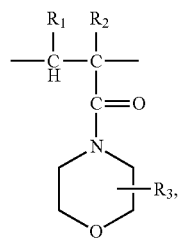

formula (1)

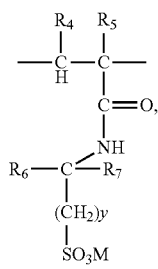

formula (2)

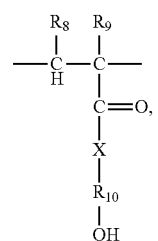

formula (3)

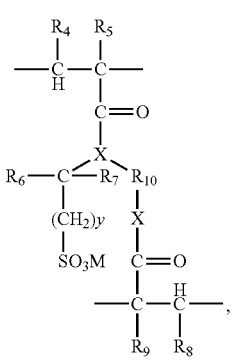

formula (4)

wherein, $R_1$-$R_9$ are H or $C_1$-$C_3$ linear or branched alkyl respectively, y is an integer within 1-5, M is H or an alkali metal element, X is O or NH, and $R_{10}$ is $C_1$-$C_5$ linear or branched alkylidene.

The present invention further provides a filtrate reducer for drilling fluid, which is prepared with a method that comprises the following steps:

(I) homogeneously mixing an initiator and a monomer mixture in an aqueous solvent and controlling them to have polymerization reaction under olefinic polymerization reaction conditions, wherein, the monomer mixture contains a monomer A expressed by formula (5), a monomer B expressed by formula (6), and a cross-linked monomer C expressed by formula (7); on the basis of 1 mol monomer A, the dosage of the monomer B is 0.5-10 mol, and the dosage of the cross-linked monomer C is 0.01-0.05 mol;

(II) controlling the product obtained in step (I) to have cross-linking reaction under cross-linking reaction conditions;

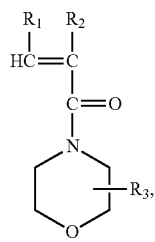

formula (5)

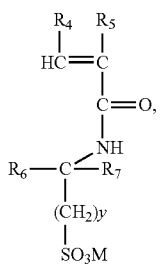

formula (6)

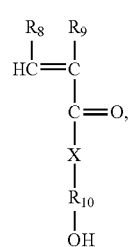

formula (7)

wherein, $R_1$-$R_9$ are H or $C_1$-$C_3$ linear or branched alkyl respectively, y is an integer within 1-5, M is H or an alkali metal element, X is O or NH, and $R_{10}$ is $C_1$-$C_5$ linear or branched alkylidene.

Moreover, the present invention further provides an use of the acryloylmorpholine polymer as a filtrate reducer for drilling fluid.

The present invention has the following beneficial effects: the hydrolysis-resistant monomer A that has large pendant group and the monomer B that contains sulfonic (sulfonate) groups are controlled to have copolymerization reaction in existence of the cross-linked monomer C, so that the obtained filtrate reducer for drilling fluid has appropriate degree of cross-linking, and thereby has not only outstanding filtrate reduction performance but also good viscosity increasing effect under high temperature, high salinity, and high calcium content conditions, i.e., the obtained filtrate reducer for drilling fluid has high temperature resistance and salt resistance performance. It can be seen from the results of the Examples: for a compound brine base mud that contains the filtrate reducer for drilling fluid in the present invention, after aging for 16 h at 220° C., the filter loss can be reduced to equal to or less than 14.0 mL, the apparent viscosity can be increased to equal to or above 11.5 mPa·s, and the plastic viscosity can be increased to equal to or above 8.5 mPa·s; for a high calcium-content brine base mud that contains the filtrate reducer for drilling fluid in the present invention, after aging for 16 h at 220° C., the filter loss can be reduced to equal to or less than 15.5 mL, the apparent viscosity can be increased to equal to or above 10.5 mPa·s, and the plastic viscosity can be increased to equal to or above 5 mPa·s; for a saturated brine base mud that contains the filtrate reducer for drilling fluid in the present invention, after aging for 16 h at 220° C., the filter loss can be reduced to equal to or less than 22 mL, the apparent viscosity can be increased to equal to or above 28 mPa·s, and the plastic viscosity can be increased to equal to or above 23 mPa·s.

Moreover, the filtrate reducer for drilling fluid is prepared by controlling the reactants to have polymerization reaction quickly in an aqueous solvent and then controlling the polymerization product to have cross-linking reaction. The preparation process is easy to control, the operation is simple, the product quality is stable, and the production and drying process consume low energy, and the preparation process has no environmental pollution.

DETAILED DESCRIPTION OF THE EMBODIMENTS

Hereunder the embodiments of the present invention will be detailed. It should be appreciated that the embodiments described here are only provided to describe and explain the present invention, but shall not be deemed as constituting any limitation to the present invention.

The acryloylmorpholine polymer provided in the present invention comprises structural units expressed by formula (1), structural units expressed by formula (2), and structural units expressed by formula (3), wherein, at least a part of the structural units expressed by formula (2) are bonded with at least a part of the structural units expressed by formula (3) into cross-linked structural units expressed by formula (4); on the basis of 1 mol structural units expressed by formula (1), the total content of the structural units expressed by formula (2) and cross-linked structural units expressed by formula (4) is 0.5-10 mol, preferably 0.7-9.17 mol, and the total content of the structural units expressed by formula (3) and the cross-linked structural units expressed by formula (4) is 0.01-0.05 mol, preferably 0.011-0.047 mol;

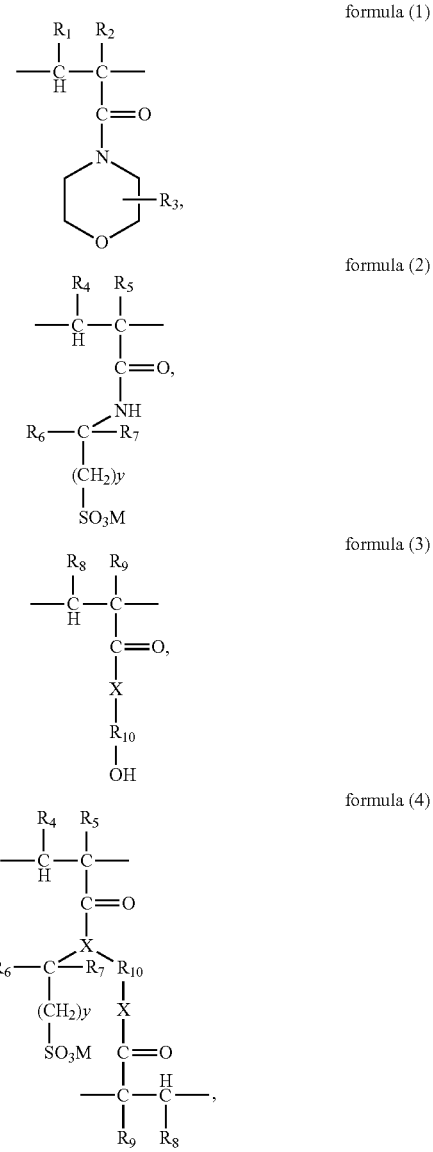

wherein, $R_1$-$R_9$ are H or $C_1$-$C_3$ linear or branched alkyl respectively, y is an integer within 1-5, M is H or an alkali metal element, X is O or NH, and $R_{10}$ is $C_1$-$C_5$ linear or branched alkylidene.

In the present invention, the $C_1$-$C_3$ linear or branched alkyl can be methyl, ethyl, n-propyl, or isopropyl. The $C_1$-$C_5$ linear or branched alkylidene can be methylene, ethylidene, n-propylidene, iso-propylidene, n-butylidene, iso-butylidene, n-pentylidene, or iso-pentylidene.

The alkali metal element can be one or more selected from the group consisting of Li, Na, and K. Preferably, M is H, K, or Na. M can be the same or different among different structural units of the same polymer.

Particularly preferably, in formula (1), $R_1$-$R_3$ are H; in that case, the monomer corresponding to the structural unit is N-acryloylmorpholine.

Particularly preferably, in formula (2), $R_4$ and $R_5$ are H, $R_6$ and $R_7$ are methyl, y is 1, and M is Na; in that case, the monomer corresponding to the structural unit is 2-acrylamide-2-methyl propane sulfonic acid sodium.

Particularly preferably, in formula (3):

$R_8$ and $R_9$ are H, X is NH, and $R_{10}$ is methylene; in that case, the monomer corresponding to the structural unit is N-methylol acrylamide; or, $R_8$ and $R_9$ are H, X is O, and $R_{10}$ is ethylidene; in that case, the monomer corresponding to the structural unit is hydroxyl-ethyl acrylate; or, $R_8$ is H, $R_9$ is methyl, X is O, and $R_{10}$ is ethylidene; in that case, the monomer corresponding to the structural unit is hydroxyl-ethyl methacrylate; or, $R_8$ and $R_9$ are H, X is O, and $R_{10}$ is

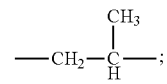

in that case, the monomer corresponding to the structural unit is hydroxy-propyl acrylate.

In the present invention, there is no specific restriction to the apparent viscosity of the acryloylmorpholine polymer; preferably, the apparent viscosity of 1 wt. % water solution of acryloylmorpholine polymer is 30-55 mPa·s. The apparent viscosity is measured with a Fan-35 rotary viscosimeter at 25° C.

The filtrate reducer for drilling fluid provided in the present invention is prepared with a method that comprises the following steps:

(I) homogeneously mixing an initiator and a monomer mixture in an aqueous solvent and controlling them to have polymerization reaction under olefinic polymerization reaction conditions, wherein, the monomer mixture contains a monomer A expressed by formula (5), a monomer B expressed by formula (6), and a cross-linked monomer C expressed by formula (7); on the basis of 1 mol monomer A, the dosage of the monomer B is 0.5-10 mol, preferably 0.7-9.17 mol, and the dosage of the cross-linked monomer C is 0.01-0.05 mol, preferably 0.011-0.047 mol;

(II) controlling the product obtained in step (I) to have cross-linking reaction under cross-linking reaction conditions;

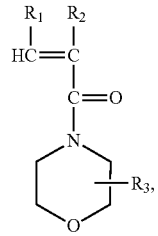

formula (5)

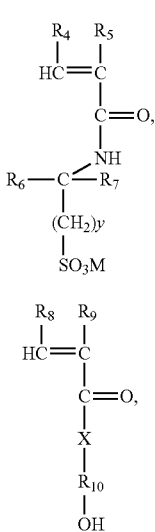

formula (6)

formula (7)

wherein, $R_1$-$R_9$ are H or $C_1$-$C_3$ linear or branched alkyl respectively, y is an integer within 1-5, M is H or an alkali metal element, X is O or NH, and $R_{10}$ is $C_1$-$C_5$ linear or branched alkylidene.

The instances of the $C_1$-$C_3$ linear or branched alkyl, $C_1$-$C_5$ linear or branched alkylidene, and alkali metal element have been described above, and will not be detailed further here.

In the present invention, the aqueous solvent can be any existing solvent with water that can be used as a reaction medium; for example, it can be water or mixture of water and any other solvent, preferably is water. On the basis of 100 parts by weight of the monomer mixture, the dosage of the aqueous solvent can be 50-150 parts by weight.

Particularly preferably, the monomer A is N-acryloylmorpholine.

Particularly preferably, the monomer B is 2-acrylamide-2-methyl propane sulfonic acid sodium.

When the monomer B is 2-acrylamide-2-methyl propane sulfonic acid sodium, it can be bought commercially or prepared with the following method: controlling 2-acrylamide-2-methyl propane sulfonic acid and sodium carbonate or sodium hydroxide to have neutralization reaction in water solution at a temperature not higher than 15° C., and filtering off the impurities after the reaction. The preparation process of 2-acrylamide-2-methyl propane sulfonic acid sodium is a purification process of 2-acrylamido-2-methyl propane sulfonic acid.

Particularly preferably, the cross-linked monomer C is one or more selected from the group consisting of N-ethoxyl acrylamide, N-methylol acrylamide, hydroxy-methyl acrylate, hydroxy-methyl methacrylate, hydroxy-ethyl acrylate, hydroxy-ethyl methacrylate, hydroxy-propyl methacrylate, and hydroxy-propyl acrylate; especially preferably, the cross-linked monomer C is one or more selected from the group consisting of N-methylol acrylamide, hydroxy-ethyl acrylate, hydroxy-ethyl methacrylate, and hydroxy-propyl acrylate.

In the present invention, the monomer B is used preferably in a form of 40-60 wt. % water solution. In the present invention, there is no specific restriction to the method for homogeneously mixing the initiator and monomer mixture in the aqueous solvent; for example, the above-mentioned substances can be added together into the aqueous solvent and agitated to homogeneous state; particularly preferably, homogeneously mixing a water solution of monomer B with water first; then, adding monomer A and cross-linked monomer C and agitating to homogeneous state; next, adjusting the pH of the obtained mixture to 6-9, and then adding the initiator. It should be noted that if the monomer B is used in a form of water solution, the dosage of water includes the dosage of water in the water solution of the monomer B. In addition, the method for adjusting the pH of the mixture is well known to those skilled in the art; for example, an alkaline substance can be added into the mixture. The alkaline substance can be a common choice in the art; for example, it can be selected from one or more selected from the group consisting of sodium hydroxide, potassium hydroxide, sodium carbonate, potassium carbonate, sodium bicarbonate, and potassium bicarbonate. The alkaline substance can be used in a form of solid or water solution. If the alkaline substance is used in the form of water solution, the concentration can be 10 wt. % to saturated concentration.

In the present invention, there is no specific restriction to the type and dosage of the initiator, as long as the initiator can initiate the polymerization reaction of the monomer mixture. For example, the initiator can be one or more selected from the group consisting of azo initiators, peroxide initiators, and redox initiators, particularly preferably a redox initiator. In the redox initiator, the oxidizer can be potassium persulfate and/or ammonium persulfate, and the reducer can be one or more selected from the group consisting of sodium bisulfite, sodium pyrosulfite, sodium sulfite, and sodium thiosulfate. On the basis of 100 parts by weight of the monomer mixture, the dosage of the initiator can be 0.1-0.9 parts by weight, preferably 0.3-0.6 parts by weight. Wherein, in the redox initiator, the weight ratio of oxidizer to reducer can be 0.5-1.5:1, most preferably 1:1.

In the present invention, there is no specific restriction to the olefinic polymerization reaction conditions, as long as the monomer mixture can be polymerized under the conditions; for example, the polymerization reaction conditions include reaction temperature is 30-60° C., reaction time is 15-60 min., and pH is 6-9.

There is no specific restriction to the cross-linking reaction conditions in the present invention, as long as at least a part of the structural units expressed by formula (2) can be bonded with at least a part of the structural units expressed by formula (3) into the cross-linked structural units expressed by formula (4); for example, the cross-linking reaction conditions include reaction temperature is 90-100° C. and reaction time is 2-6 h. The cross-linking reaction is preferably carried out in an enclosed environment.

In the present invention, there is no specific restriction to the apparent viscosity of the product of the olefinic polymerization and the apparent viscosity of the filtrate reducer for drilling fluid; preferably, the apparent viscosity of 1 wt. % water solution of the product obtained from olefinic polymerization is 5-7.5 mPa·s, and the apparent viscosity of 1 wt. % water solution of the filtrate reducer for drilling fluid is 30-55 mPa·s. The apparent viscosity is measured with a Fan-35 rotary viscometer at 25° C. The increased apparent viscosity of the polymer solution proves the occurrence of the cross-linking reaction.

In the present invention, preferably, the method for preparation of the filtrate reducer for drilling fluid further comprises a process of shearing, drying, and crushing the obtained product of cross-linking reaction in step (II). The shearing, drying, and crushing procedures are known to those skilled in the art, and will not be detailed further here.

Moreover, the present invention provides the use of the acryloylmorpholine polymer as a filtrate reducer for drilling fluid.

Other characteristics and advantages of the present invention will be further detailed in the embodiments hereunder.

In the following examples and comparative examples:

The apparent viscosity of 1 wt. % water solution of the product obtained from the olefinic polymerization reaction and the apparent viscosity of the 1 wt. % water solution of acryloylmorpholine polymer are measured with a Fan-35 rotary viscosimeter at 25° C. The contents of the structural units in the acryloylmorpholine polymer are calculated on the basis of the dosages of the monomers.

In the following test examples and comparative test examples:

AMPS-AA copolymer viscosity reducer: produced by Zhongyuan Oilfield Drilling Engineering Technology Research Institute, coded as XJ-1, industrial product; sulfonated lignite: produced by Oilfield Chemical Co., Ltd. of Dagang Oilfield, coded as SMC, industrial product; sodium bentonite and calcium bentonite: produced by Weifang Haoda Bentonite Co., Ltd., industrial products; barite: produced by Guizhou Kali Longteng Mining Co., Ltd., with 4.32 g/cm$^3$ density.

Example 1

Add 5 mL water into a reaction bulb with an agitator; add 180 g 50% (mass percent) water solution of 2-acrylamide-2-methyl propane sulfonic acid sodium (abbreviated as SAMPS solution) and agitate to homogeneous state; add 6 g N-acryloylmorpholine and 0.2 g N-methylol acrylamide, and agitate till they are dissolved; adjust the pH of the system to 6 with 20% (mass percent) sodium hydroxide solution, to obtain a monomer mixture. Transfer the monomer mixture into a polymerization reactor made of polypropylene plastics; add 0.104 g ammonium persulfate and 0.104 g sodium bisulfite sequentially while agitating; static react for 15 min at room temperature 30° C. after agitating homogeneously, to obtain a viscous product. The apparent viscosity of 1 wt. % water solution of the viscous product is 7.5 mPa·s. Then, control the viscous product to constant temperature react for 2 h at 100° C., to obtain a gelatinous elastic cross-linked polymer. Shear, dry and crush the obtained gelatinous elastic cross-linked polymer, to obtain a filtrate reducer for drilling fluid. In the gelatinous elastic cross-linked polymer, on the basis of 1 mol structural units expressed by formula (1), the total content of the structural units expressed by formula (2) and cross-linked structural units expressed by formula (4) is 9.17 mol, the total content of the structural units expressed by formula (3) and cross-linked structural units expressed by formula (4) is 0.047 mol, and the apparent viscosity of 1 wt. % water solution of the gelatinous elastic cross-linked polymer is 55 mPa·s.

Example 2

Add 10 mL water into a reaction bulb with an agitator; add 180 g 50% (mass percent) water solution of 2-acrylamide-2-methyl propane sulfonic acid sodium and agitate to homogeneous state; add 25.5 g N-acryloylmorpholine and 0.3 g N-methylol acrylamide and agitate till they are dissolved; adjust the pH of the system to 7 with 20% (mass percent) sodium hydroxide solution, to obtain a monomer mixture. Transfer the monomer mixture into a polymerization reactor made of polypropylene plastics; add 0.3 g potassium persulfate and 0.3 g sodium pyrosulfite sequentially while agitating; static react for 25 min at room temperature 60° C. after agitating homogeneously, to obtain a viscous product. The apparent viscosity of 1 wt. % water solution of the viscous product is 6.5 mPa·s. Then, control the viscous product to constant temperature react for 3 h at 95° C., to obtain a gelatinous elastic cross-linked polymer. Shear, dry and crush the obtained gelatinous elastic cross-linked polymer, to obtain a filtrate reducer for drilling fluid. In the gelatinous elastic cross-linked polymer, on the basis of 1 mol structural units expressed by formula (1), the total content of the structural units expressed by formula (2) and cross-linked structural units expressed by formula (4) is 2.17 mol, the total content of the structural units expressed by formula (3) and cross-linked structural units expressed by formula (4) is 0.016 mol, and the apparent viscosity of 1 wt. % water solution of the gelatinous elastic cross-linked polymer is 45 mPa·s.

Example 3

Add 30 mL water into a reaction bulb with an agitator; add 180 g 50% (mass percent) water solution of 2-acrylamide-2-methyl propane sulfonic acid sodium and agitate to homogeneous state; add 42 g N-acryloylmorpholine and 0.4 g N-methylol acrylamide and agitate till they are dissolved; adjust the pH of the system to 7.5 with 20% (mass percent) sodium hydroxide solution, to obtain a monomer mixture. Transfer the monomer mixture into a polymerization reactor made of polypropylene plastics; add 0.4 g potassium persulfate and 0.4 g sodium sulfite sequentially while agitating; static react for 25 min at room temperature 40° C. after agitating homogeneously, to obtain a viscous product. The apparent viscosity of 1 wt. % water solution of the viscous product is 6.25 mPa·s. Then, control the viscous product to constant temperature react for 3.5 h at 95° C., to obtain a gelatinous elastic cross-linked polymer. Shear, dry and crush the obtained gelatinous elastic cross-linked polymer, to obtain a filtrate reducer for drilling fluid. In the gelatinous elastic cross-linked polymer, on the basis of 1 mol structural units expressed by formula (1), the total content of the structural units expressed by formula (2) and cross-linked structural units expressed by formula (4) is 1.32 mol, the total content of the structural units expressed by formula (3) and cross-linked structural units expressed by formula (4) is 0.013 mol, and the apparent viscosity of 1 wt. % water solution of the gelatinous elastic cross-linked polymer is 42.5 mPa·s.

Example 4

Add 70 mL water into a reaction bulb with an agitator; add 180 g 50% (mass percent) water solution of 2-acrylamide-2-methyl propane sulfonic acid sodium and agitate to homogeneous state; add 79 g N-acryloylmorpholine and 0.6 g N-methylol acrylamide and agitate till they are dissolved; adjust the pH of the system to 8 with 20% (mass percent) sodium hydroxide solution, to obtain a monomer mixture. Transfer the monomer mixture into a polymerization reactor made of polypropylene plastics; add 1.53 g ammonium persulfate and 0.75 g sodium thiosulfate sequentially while agitating; static react for 15 min at room temperature 30° C. after agitating homogeneously, to obtain a viscous product. The apparent viscosity of 1 wt. % water solution of the viscous product is 5.25 mPa·s. Then, control the viscous product to constant temperature react for 5 h at 100° C., to obtain a gelatinous elastic cross-linked polymer. Shear, dry and crush the obtained gelatinous elastic cross-linked polymer, to obtain a filtrate reducer for drilling fluid. In the gelatinous elastic cross-linked polymer, on the basis of 1 mol structural units expressed by formula (1), the total content of the structural units expressed by formula (2) and cross-linked structural units expressed by formula (4) is 0.70 mol, the total content of the structural units expressed by formula (3) and cross-linked structural units expressed by formula (4) is 0.011 mol, and the apparent viscosity of 1 wt. % water solution of the gelatinous elastic cross-linked polymer is 33.5 mPa·s.

Examples 5-8

Prepare acryloylmorpholine polymer and filtrate reducer for drilling fluid with the method described in Example 1, with the following difference: the reactants, reaction conditions, and apparent viscosity of the obtained filtrate reducer for drilling fluid are those shown in Table 1.

TABLE 1

|  |  | Example | | | |
|---|---|---|---|---|---|
|  |  | 5 | 6 | 7 | 8 |
| 50% (mass percent) water solution of SAMPS/g | | 180 | 180 | 180 | 180 |
| N-acryloylmorpholine/g | | 25.5 | 42 | 60 | 79 |
| Water/mL | | 5 | 30 | 40 | 70 |
| Initiator | ammonium persulfate/g | 0.3 | 0.35 | 0.4 | 0.45 |
|  | sodium sulfite/g | 0.3 | 0.35 | 0.4 | 0.45 |
| Cross-linked monomer | N-methylol acrylamide/g | — | — | — | 0.6 |
|  | hydroxy-ethyl acrylate/g | — | — | 0.5 | — |
|  | hydroxy-ethyl methacrylate/g | 0.25 | — | — | — |
|  | hydroxy-propyl acrylate/g | — | 0.40 | — | — |
|  | pH | 7 | 9 | 8 | 8 |
| Static reaction temperature/time (° C./min.) | | 30/30 | 30/20 | 30/40 | 30/60 |
| Constant temperature reaction temperature/time (° C./h) | | 100/3 | 95/4 | 100/6 | 90/2.5 |
| Apparent viscosity of 1 wt. % water solution of the viscous product (mPa · s) | | 6.25 | 6.5 | 5.5 | 6 |
| Apparent viscosity of 1 wt. % water solution of the gelatinous elastic cross-linked polymer (mPa · s) | | 43.5 | 44.5 | 37.5 | 39.5 |
| Content of structural units (mol) | Structural units expressed by formula (1) | 1 | 1 | 1 | 1 |
|  | Structural units expressed by formula (2) + structural units expressed by formula (4) | 2.17 | 1.32 | 0.92 | 0.70 |
|  | Structural units expressed by formula (3) + structural units expressed by formula (4) | 0.011 | 0.010 | 0.010 | 0.011 |

Example 9

The 2-acrylamide sodium hexanesulfonate monomer used in this Example (with the structure expressed by formula (2), wherein, $R_4$-$R_7$ are H, y is 5, and M is Na) is prepared with the following method: add 371 g acrylonitrile into a 500 mL reaction bulb with agitator, thermometer, dropping funnel, and vent tube, decrease the temperature to 0° C. with ice water bath, and add 104 g fuming sulfuric acid in droplets within 45 min at 0-10° C. Then, decrease the temperature to −10° C., add 84 g 1-hexene in droplets within 90 min at 20° C., and keep the reaction for 60 min at 35° C. Next, add 200 mL water, agitate for 2.5 h at room temperature 25° C., filter off excessive acrylonitrile, wash the obtained crystal with 150 g acrylonitrile for three cycles, and then wash with 100 g glacial acetic acid; then, dry for 4 h in a vacuum environment at 50° C.

Prepare acryloylmorpholine polymer and filtrate reducer for drilling fluid with the method described in Example 2, with the following difference: the water solution of 2-acrylamide-2-methyl propane sulfonic acid sodium is replaced with water solution of 2-acrylamide sodium hexanesulfonate monomer (the same parts by weight and the same concentration), to obtain a viscous product. The apparent viscosity of 1 wt. % water solution of the viscous product is 6.0 mPa·s. Then, control the viscous product to constant temperature to react for 2 h at 100° C., to obtain a gelatinous elastic cross-linked polymer. Shear, dry and crush the obtained gelatinous elastic cross-linked polymer, to obtain a filtrate reducer for drilling fluid. In the gelatinous elastic cross-linked polymer, on the basis of 1 mol structural units expressed by formula (1), the total content of the structural units expressed by formula (2) and cross-linked structural units expressed by formula (4) is 2.14 mol, the total content of the structural units expressed by formula (3) and cross-linked structural units expressed by formula (4) is 0.018 mol, and the apparent viscosity of 1 wt. % water solution of the gelatinous elastic cross-linked polymer is 41.5 mPa·s.

Comparative Example 1

Add 80 mL water into a reaction bulb with an agitator; add 11.6 g sodium hydroxide and wait till it is dissolved; add 60 g 2-acrylamide-2-methyl propane sulfonic acid while agitating, and keep on agitation till it is dissolved completely; add 26 g acrylamide and agitate till it is dissolved; adjust the pH of the system to 9 with 45% (mass percent) sodium hydroxide solution, to obtain a monomer mixture. Transfer the monomer mixture into a polymerization reactor made of polypropylene plastics; add 0.25 g potassium persulfate and 0.25 g sodium bisulfite sequentially while agitating; static react for 15 min at 30° C. after agitating homogeneously, to obtain a viscous and elastic product. Then, shear, dry and crush the obtained viscous elastic product, to obtain a reference filtrate reducer for drilling fluid, wherein, the apparent viscosity of 1 wt. % water solution of the reference filtrate reducer for drilling fluid is 36.0 mPa·s.

Comparative Example 2

Add 80 mL water into a reaction bulb with an agitator; add 15.5 g sodium hydroxide and wait till it is dissolved; add 80 g 2-acrylamide-2-methyl propane sulfonic acid while agitating, and keep on agitation till it is dissolved completely; add 6 g N-acryloylmorpholine and agitate till it is dissolved; adjust the pH of the system to 6 with 45% (mass percent) sodium hydroxide solution, to obtain a monomer mixture. Transfer the monomer mixture into a polymerization reactor made of polypropylene plastics; add 0.25 g potassium persulfate and 0.25 g sodium bisulfite sequentially while agitating; static react for 15 min at 30° C. after agitating homogeneously, to obtain a viscous product. The apparent viscosity of 1 wt. % water solution of the viscous product is 4.25 mPa·s. Control the obtained viscous product to have constant temperature reaction for 2 h at 100° C.; shear, dry, and crush the product, to obtain a reference filtrate reducer for drilling fluid, wherein, the apparent viscosity of 1 wt. % water solution of the reference filtrate reducer for drilling fluid is 4.5 mPa·s.

Test Examples 1-9

The Test Examples 1-9 are provided here to describe the evaluation of the performance of the acryloylmorpholine polymer and filtrate reducer for drilling fluid provided in the present invention. The base mud and testing method used in the evaluation are:

(1) Preparation of Base Mud:

A. Compound brine base mud: add 45 g NaCl, 5 g anhydrous $CaCl_2$, 13 g $MgCl_2 \cdot 6H_2O$, 150 g calcium bentonite, and 9 g anhydrous $Na_2CO_3$ into 1,000 mL distilled water, agitate at a high speed (at 10,000 rpm agitation speed, the same below) for 20 min., and maintain for 24 h at 25° C., to obtain a compound brine base mud.

B. High calcium-content brine base mud: 5 wt. % sodium bentonite+40 wt. % $CaCl_2$+2.5 wt. % anhydrous $Na_2CO_3$+5.0 wt. % sulfonated lignite+1.0 wt. % AMPS-AA copolymer viscosity reducer+46.5 wt. % water, weight up with barite to 1.5 g/cm$^3$ density, agitate at a high speed for 20 min, and maintain for 24 h at 25° C., to obtain a high calcium-content brine base mud.

C. Saturated brine base mud: 6 wt. % sodium bentonite+36 wt. % NaCl+2.5 wt. % anhydrous $Na_2CO_3$+2 wt. % sulfonated lignite+53.5 wt. % water, weight up with barite to 1.5 g/cm$^3$ density, agitate at a high speed for 20 min, and maintain for 24 h at 25° C., to obtain a saturated brine base mud.

(2) Testing:

A. Apparent Viscosity (AV):

Add the prepared filtrate reducer for drilling fluid into the three types of base mud respectively, agitate at a high speed for 5 min, carry out roll aging for 16 h at 220° C., and then agitate at a high speed for 5 min at 25° C.; measure the reading at 600 r/min rotation speed with a six-speed rotary viscosimeter, and calculate with the following formula to obtain the apparent viscosity:

$$AV = \frac{\Phi_{600}}{2}$$

wherein, $\Phi_{600}$ is the reading obtained with the six-speed rotary viscosimeter at 600 r/min rotation speed. The dosages of the filtrate reducers for drilling fluid and the results are shown in Table 2.

B. Plastic Viscosity (PV):

Add the prepared filtrate reducer for drilling fluid into the three types of base mud respectively, agitate at a high speed for 5 min, carry out roll aging for 16 h at 220° C., and then agitate at a high speed for 5 min at 25° C.; measure the reading at 600 r/min and 300 r/min rotation speed with a six-speed rotary viscosimeter respectively, and calculate with the following formula to obtain the plastic viscosity:

$$PV = \Phi_{600} - \Phi_{300}$$

wherein, $\Phi_{600}$ is the reading obtained with the six-speed rotary viscosimeter at 600 r/min rotation speed, and $\Phi_{300}$ is the reading obtained with the six-speed rotary viscosimeter at 300 r/min rotation speed. The dosages of the filtrate reducers for drilling fluid and the results are shown in Table 2.

C. Yield Point (YP):

Add the prepared filtrate reducer for drilling fluid into the three types of base mud respectively, agitate at a high speed for 5 min, carry out roll aging for 16 h at 220° C., and then agitate at a high speed for 5 min at 25° C.; measure the reading at 300 r/min rotation speed with a six-speed rotary viscosimeter respectively, and calculate with the following formula to obtain the yield point (YP):

$$YP = 0.48(\Phi_{300} - PV)$$

wherein, $\Phi_{300}$ is the reading obtained with the six-speed rotary viscosimeter at 300 r/min rotation speed, and PV is plastic viscosity. The dosages of the filtrate reducers for drilling fluid and the results are shown in Table 2.

D. Filter Loss:

Add the prepared filtrate reducer for drilling fluid into the three types of base mud respectively, agitate at a high speed for 5 min, carry out roll aging for 16 h at 220° C., and then agitate at a high speed for 5 min at 25° C.; measure the filter loss of the drilling fluid with a ZNS drilling fluid filter loss meter. The dosages of the filtrate reducers for drilling fluid and the results are shown in Table 2.

Comparative Test Examples 1-2

The Comparative Test Examples 1-2 are provided here to describe the evaluation of the performance of the reference filtrate reducers for drilling fluid.

Test the performance of the reference polymerized filtrate reducers obtained in the Comparative Examples 1-2 with the method used in the Test Examples 1-9. The results are shown in Table 2.

TABLE 2

| Base mud and dosage of filtrate reducer | Properties of drilling fluid | Base mud | Example | | | | | | | | | Comparative Example | |
|---|---|---|---|---|---|---|---|---|---|---|---|---|---|
| | | | 1 | 2 | 3 | 4 | 5 | 6 | 7 | 8 | 9 | 1 | 2 |
| Compound brine base mud, dosage of filtrate reducer is 2.5 wt. % | Apparent viscosity/mPa·s | 3.5 | 11.5 | 13.5 | 12.0 | 11.5 | 13.0 | 12.5 | 11.5 | 13.5 | 13.0 | 5.0 | 7.5 |
| | Plastic viscosity/mPa·s | 3 | 9 | 10 | 9 | 8.5 | 10 | 9 | 9 | 9.5 | 10.5 | 4.0 | 6.0 |
| | Yield point/Pa | 0.5 | 2.5 | 3.5 | 3.0 | 3.0 | 3.0 | 3.5 | 2.5 | 4.0 | 2.5 | 1.0 | 1.5 |
| | Filter loss/mL | 162 | 12.0 | 11.0 | 12.5 | 9.0 | 14.0 | 12.3 | 11.0 | 11.5 | 11.2 | 78 | 32 |
| High calcium-content brine base mud, dosage of | Apparent viscosity/mPa·s | 3.5 | 13.5 | 10.5 | 15.5 | 12.5 | 10.5 | 14.5 | 14.0 | 11.0 | 14.0 | 8.0 | 9.0 |
| | Plastic viscosity/mPa·s | 3 | 7 | 5 | 10 | 7.5 | 6 | 9 | 8 | 5.5 | 8 | 6 | 6 |

TABLE 2-continued

| Base mud and dosage of filtrate reducer | Properties of drilling fluid | Base mud | Example 1 | 2 | 3 | 4 | 5 | 6 | 7 | 8 | 9 | Comparative Example 1 | 2 |
|---|---|---|---|---|---|---|---|---|---|---|---|---|---|
| filtrate reducer is 3.5 wt. % | Yield point/Pa | 0.5 | 6.2 | 5.5 | 5.5 | 5.0 | 4.5 | 5.5 | 6.0 | 5.5 | 6 | 2 | 3 |
| | Filter loss/mL | 168 | 13.5 | 12.4 | 13.0 | 13.4 | 15.5 | 12.0 | 13.8 | 14.5 | 13.1 | 195 | 65 |
| Saturated brine base mud, dosage of filtrate reducer is 3.5 wt. % | Apparent viscosity/mPa·s | 12 | 28 | 31 | 35 | 30 | 30.5 | 33 | 32 | 33 | 29 | 18 | 22 |
| | Plastic viscosity/mPa·s | 9 | 23 | 25 | 28 | 26 | 26 | 27 | 27 | 27 | 23 | 13 | 17 |
| | Yield point/Pa | 3 | 5 | 6 | 7 | 4 | 4.5 | 6 | 5 | 6 | 6 | 5 | 5 |
| | Filter loss/mL | 230 | 17 | 19.5 | 18 | 22 | 20.4 | 19.0 | 18.3 | 19.8 | 18.5 | 58 | 44 |

It is seen from the results shown in Table 2: when used in compound brine base mud, high calcium-content base mud, and saturated brine base mud, the acryloylmorpholine polymer filtrate reducer for drilling fluid achieves outstanding filtrate reduction and viscosity increasing effects after aging for 16 h at 220° C., which is far better than the effects that can be achieved with the polymers obtained in the Comparative Examples after aging for 16 h at 220° C., which is to say, the filtrate reducer for drilling fluid provided in the present invention has outstanding temperature tolerance and salt resistance performance, and is very suitable for use in well drilling application in ultra deep wells, high pressure and high saline-content formations.

The invention claimed is:

1. An acryloylmorpholine polymer, comprising structural units expressed by formula (1), structural units expressed by formula (2), and structural units expressed by formula (3), wherein, at least a part of the structural units expressed by formula (2) are bonded with at least a part of the structural units expressed by formula (3) into cross-linked structural units expressed by formula (4); on basis of 1 mol structural units expressed by formula (1), a total content of the structural units expressed by formula (2) and the cross-linked structural units expressed by formula (4) is 0.5-10 mol, and a total content of the structural units expressed by formula (3) and the cross-linked structural units expressed by formula (4) is 0.01-0.05 mol;

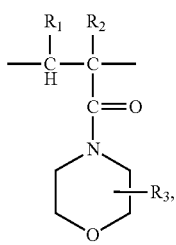

formula (1)

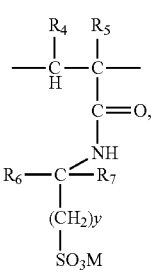

formula (2)

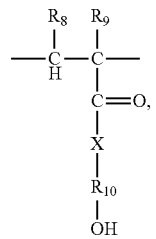

formula (3)

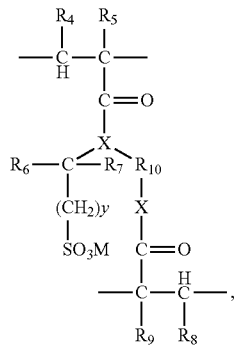

formula (4)

wherein, $R_1$-$R_9$ are H or $C_1$-$C_3$ linear or branched alkyl respectively, y is an integer within 1-5, M is H or an alkali metal element, X is O or NH, and $R_{10}$ is $C_1$-$C_5$ linear or branched alkylidene.

2. The acryloylmorpholine polymer according to claim 1, wherein in formula (1), $R_1$-$R_3$ are H.

3. The acryloylmorpholine polymer according to claim 1, wherein in formula (2), $R_4$ and $R_5$ are H, $R_6$ and $R_7$ are methyl, y is 1, and M is Na.

4. The acryloylmorpholine polymer according to claim 1, wherein in formula (3):
$R_8$ and $R_9$ are H, X is NH, and $R_{10}$ is methylene; or,
$R_8$ and $R_9$ are H, X is O, and $R_{10}$ is ethylidene; or,
$R_8$ is H, $R_9$ is methyl, X is O, and $R_{10}$ is ethylidene; or,
$R_8$ and $R_9$ are H, X is O, and $R_{10}$ is

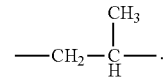

5. The acryloylmorpholine polymer according to claim 1, wherein an apparent viscosity of a 1 wt. % water solution of the acryloylmorpholine polymer is 30-55 mPa·s.

6. A filtrate reducer for drilling fluid prepared with a method comprising the following steps:

(I) homogeneously mixing an initiator and a monomer mixture in an aqueous solvent and controlling them to have polymerization reaction under olefinic polymerization reaction conditions, wherein, the monomer mixture contains a monomer A expressed by formula (5), a monomer B expressed by formula (6), and a cross-linked monomer C expressed by formula (7); on the basis of 1 mol monomer A, a dosage of the monomer B is 0.5-10 mol, and a dosage of the cross-linked monomer C is 0.01-0.05 mol;

(II) controlling the product obtained in step (I) to have cross-linking reaction under cross-linking reaction conditions;

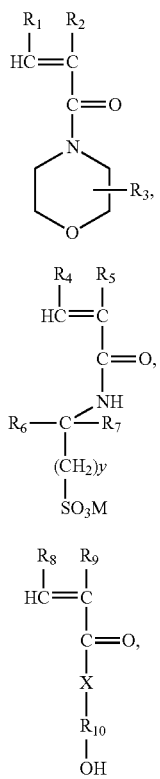

formula (5)

formula (6)

formula (7)

wherein, $R_1$-$R_9$ are H or $C_1$-$C_3$ linear or branched alkyl respectively, y is an integer within 1-5, M is H or an alkali metal element, X is O or NH, and $R_{10}$ is $C_1$-$C_5$ linear or branched alkylidene.

7. The filtrate reducer for drilling fluid according to claim 6, wherein the aqueous solvent is water.

8. The filtrate reducer for drilling fluid according to claim 7, wherein the monomer B is used in a form of 40-60 wt. % water solution; the method for homogeneously mixing the initiator and monomer mixture in the aqueous solvent comprising: homogeneously mixing a water solution of monomer B with water, adding monomer A and cross-linked monomer C and agitating to homogeneous state, adjusting the pH of the obtained mixture to 6-9, and then adding the initiator.

9. The filtrate reducer for drilling fluid according to claim 6, wherein the monomer A is N-acryloylmorpholine.

10. The filtrate reducer for drilling fluid according to claim 6, wherein the monomer B is 2-acrylamide-2-methyl propane sulfonic acid sodium.

11. The filtrate reducer for drilling fluid according to claim 6, wherein the cross-linked monomer C is one or more selected from the group consisting of N-methylol acrylamide, hydroxy-ethyl acrylate, hydroxy-ethyl methacrylate, and hydroxy-propyl acrylate.

12. The filtrate reducer for drilling fluid according to claim 6, wherein the olefinic polymerization reaction conditions include: reaction temperature is 30-60° C., reaction time is 15-60 min., and pH is 6-9.

13. The filtrate reducer for drilling fluid according to claim 6, wherein the cross-linking reaction conditions include: reaction temperature is 90-100° C., and reaction time is 2-6 h.

14. The filtrate reducer for drilling fluid according to claim 6, wherein on basis of 100 parts by weight of the monomer mixture, a dosage of the initiator is 0.1-0.9 parts by weight.

15. The filtrate reducer for drilling fluid according to claim 14, wherein the initiator is a redox initiator, in which an oxidizer is potassium persulfate and/or ammonium persulfate, and a reducer is one or more selected from the group consisting of sodium bisulfite, sodium pyrosulfite, sodium sulfite, and sodium thiosulfate.

16. The filtrate reducer for drilling fluid according to claim 6, wherein the method for preparation of the filtrate reducer for drilling fluid further comprising: shearing, drying, and crushing the product of the cross-linking reaction in step (II).

17. A filtrate reducer for drilling fluid comprising the acryloylmorpholine polymer according to claim 1.

18. A method for preparing an acryloylmorpholine polymer, the method comprising:

(I) homogeneously mixing an initiator and a monomer mixture in an aqueous solvent and controlling them to have polymerization reaction under olefinic polymerization reaction conditions, wherein, the monomer mixture contains a monomer A expressed by formula (5), a monomer B expressed by formula (6), and a cross-linked monomer C expressed by formula (7); on basis of 1 mol monomer A, a dosage of the monomer B is 0.5-10 mol, and a dosage of the cross-linked monomer C is 0.01-0.05 mol; and (II) controlling the product obtained in step (I) to have cross-linking reaction under cross-linking reaction conditions,

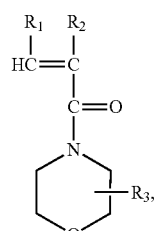

formula (5)

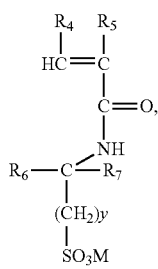

formula (6)

formula (7)

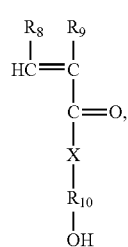

wherein, $R_1$-$R_9$ are H or $C_1$-$C_3$ linear or branched alkyl respectively, y is an integer within 1-5, M is H or an alkali metal element, X is O or NH, and $R_{10}$ is $C_1$-$C_5$ linear or branched alkylidene.

19. The method for preparing an acryloylmorpholine polymer according to claim 18, wherein:
  (i) the olefinic polymerization reaction conditions include: reaction temperature is 30-60° C., reaction time is 15-60 min., and pH is 6-9;
  (ii) the cross-linking reaction conditions include: reaction temperature is 90-100° C., and reaction time is 2-6 h; or
  (iii) the method further comprises shearing, drying, and crushing the product of the cross-linking reaction in step (II).

* * * * *